United States Patent
Takei et al.

(10) Patent No.: US 10,990,180 B2
(45) Date of Patent: Apr. 27, 2021

(54) TACTILE PRESENTATION DEVICE

(71) Applicant: FUJITSU COMPONENT LIMITED, Tokyo (JP)

(72) Inventors: Fumio Takei, Tokyo (JP); Ayumu Akabane, Tokyo (JP); Tsuyoshi Kanda, Tokyo (JP); Naoki Shimizu, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 16/356,290

(22) Filed: Mar. 18, 2019

(65) Prior Publication Data

US 2019/0302892 A1     Oct. 3, 2019

(30) Foreign Application Priority Data

Apr. 3, 2018   (JP) .............................. JP2018-071513

(51) Int. Cl.
  *G09G 3/36*     (2006.01)
  *G06F 3/01*     (2006.01)
  *G06F 3/0488*   (2013.01)
  *G06F 3/041*    (2006.01)

(52) U.S. Cl.
  CPC ............ *G06F 3/016* (2013.01); *G06F 3/0488* (2013.01); *G06F 3/0416* (2013.01)

(58) Field of Classification Search
  CPC ... G09G 3/36; G09G 3/30; G09G 5/00; G06F 3/041; G06F 3/045; G06F 3/043; G06F 3/042; G06F 3/038
  See application file for complete search history.

(56) References Cited

U.S. PATENT DOCUMENTS

| | | |
|---|---|---|
| 2002/0149571 A1 | 10/2002 | Roberts |
| 2002/0175836 A1 | 11/2002 | Roberts |
| 2003/0067449 A1 | 4/2003 | Yoshikawa et al. |
| 2007/0279398 A1 | 12/2007 | Tsumura et al. |
| 2009/0250267 A1 | 10/2009 | Heubel et al. |

(Continued)

FOREIGN PATENT DOCUMENTS

| | | |
|---|---|---|
| CN | 1270227 C | 8/2006 |
| JP | 2003-122507 | 4/2003 |

(Continued)

OTHER PUBLICATIONS

Japanese Platform for Patent Information English abstract for Japanese Patent Publication No. 2003-122507, published Apr. 25, 2003.

(Continued)

*Primary Examiner* — Pegeman Karimi
(74) *Attorney, Agent, or Firm* — Staas & Halsey LLP

(57) ABSTRACT

A tactile presentation device includes: a substrate that has a lower surface on which a vibration generation element is mounted, and an upper surface opposite to the lower surface; a first adhesive layer that is disposed on the upper surface of the substrate; a first elastic layer that is disposed on the first adhesive layer, and has a lower elastic modulus than an elastic modulus of the substrate; wherein the elastic modulus of the first elastic layer corresponding to a frequency of an ultrasonic band of the vibration generation element is equal to or more than 1 GPa.

7 Claims, 11 Drawing Sheets

(56) References Cited

U.S. PATENT DOCUMENTS

| | | | |
|---|---|---|---|
| 2011/0115734 A1 | 5/2011 | Harashima et al. | |
| 2013/0082951 A1* | 4/2013 | Tanaka | G06F 3/041 345/173 |
| 2013/0249571 A1 | 9/2013 | Okuno et al. | |
| 2015/0145657 A1* | 5/2015 | Levesque | G06F 3/016 340/407.2 |
| 2017/0192611 A1* | 7/2017 | Yang | G06F 3/0412 |
| 2018/0108827 A1* | 4/2018 | Hakkens | H01L 41/0926 |
| 2018/0275757 A1* | 9/2018 | Cruz-Hernandez | G06F 3/016 |
| 2018/0339592 A1* | 11/2018 | Aubry | B60K 37/06 |
| 2018/0351056 A1* | 12/2018 | Huang | H01L 33/56 |

FOREIGN PATENT DOCUMENTS

| | | |
|---|---|---|
| JP | 2011-519082 | 6/2011 |
| KR | 1020110060560 | 6/2011 |
| KR | 101069642 | 10/2011 |
| TW | 200817986 A | 4/2008 |
| TW | 201124880 A1 | 7/2011 |
| TW | 201237707 A | 9/2012 |
| TW | 201610080 A | 3/2016 |
| TW | M549896 U | 10/2017 |

OTHER PUBLICATIONS

Notice of Examination Opinion, dated Apr. 30, 2020, in Taiwan Application No. 108108417 (9 pp.).
Notification of Reason for Refusal, dated Aug. 27, 2020, in Korean Application No. 10-2019-0038208 (9 pp.).

* cited by examiner

FIG. 11

|  | VIBRATION AMOUNT ($\mu$m) | RATIO |
|---|---|---|
| FIRST COMPARATIVE EXAMPLE | 2.50 | 1.00 |
| SECOND COMPARATIVE EXAMPLE | 1.63 | 0.65 |
| THIRD COMPARATIVE EXAMPLE | 1.55 | 0.62 |
| FIRST EMBODIMENT | 2.38 | 0.95 |
| SECOND EMBODIMENT | 2.25 | 0.90 |
| THIRD EMBODIMENT | 2.13 | 0.85 |

TACTILE PRESENTATION DEVICE

CROSS-REFERENCE TO RELATED APPLICATION

This application is based upon and claims the benefit of priority of the prior Japanese Patent Application No. 2018-071513 filed on Apr. 3, 2018, the entire contents of which are incorporated herein by reference.

FIELD

A certain aspect of the embodiments is related to a tactile presentation device.

BACKGROUND

There has been conventionally known an interface device performing tactile feedback (e.g. see Japanese National Publication of International Patent Application No. 2011-519082). Moreover, there has been known a touch panel input device that, when a movable plate is pressed, vibrates the pressed movable plate or a support substrate for supporting the movable plate, and generates an input operation feeling to an operator (e.g. see Japanese Laid-open Patent Publication No. 2003-122507). In this type of the interface device and the touch panel input device, a vibrating member is provided on a substrate, it is possible to generate various tactile feelings by using a squeeze film effect. The squeeze film effect is a phenomenon that, when the finger approaches a vibrating surface, a film of an air occurs between the finger and the vibrating surface thereby reducing a friction force.

SUMMARY

According to an aspect of the present invention, there is provided a tactile presentation device including: a substrate that has a lower surface on which a vibration generation element is mounted, and an upper surface opposite to the lower surface; a first adhesive layer that is disposed on the upper surface of the substrate; a first elastic layer that is disposed on the first adhesive layer, and has a lower elastic modulus than an elastic modulus of the substrate; wherein the elastic modulus of the first elastic layer corresponding to a frequency of an ultrasonic band of the vibration generation element is equal to or more than 1 GPa.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a diagram illustrating a measurement result of vibration amounts of the respective vibration panels.

DESCRIPTION OF EMBODIMENTS

In the above-mentioned interface device and the above-mentioned touch panel input device, a mechanical property of a constant elastic modulus is required for the substrate to use the squeeze film effect. For example, materials having the relatively high elastic modulus of 2 GPa to 200 GPa can be used as the substrate. However, since such materials have a high elastic modulus, a processability is low. Among such materials, there is no material having a functionality such as a decorative property, an antifouling property or an antibacterial property. Therefore, there is a problem that a degree of freedom of a product is low, and the overall function is greatly constrained.

Hereinafter, a description will now be given of embodiments according to the present invention with reference to drawings.

Figure 1A:
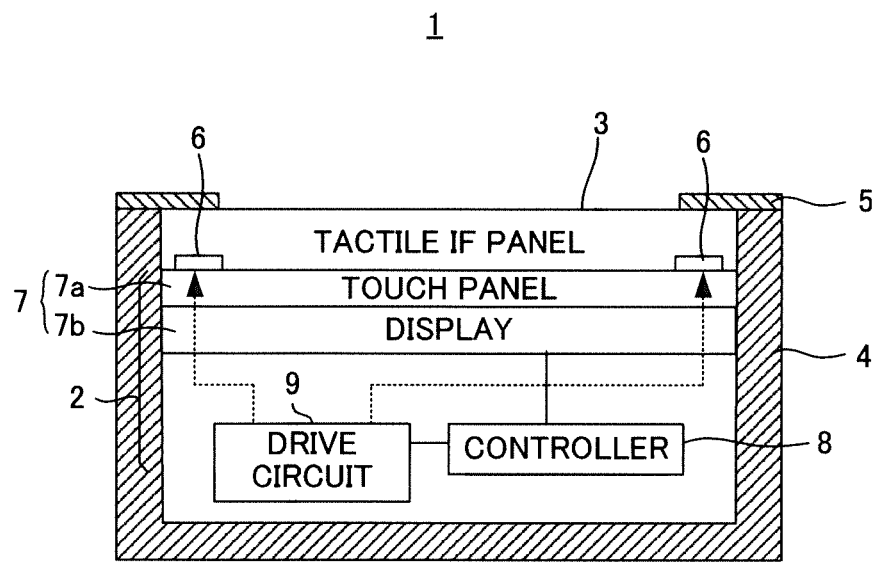
FIG. 1A is a diagram illustrating the configuration of an input device according to a present embodiment.
Figure 1B:
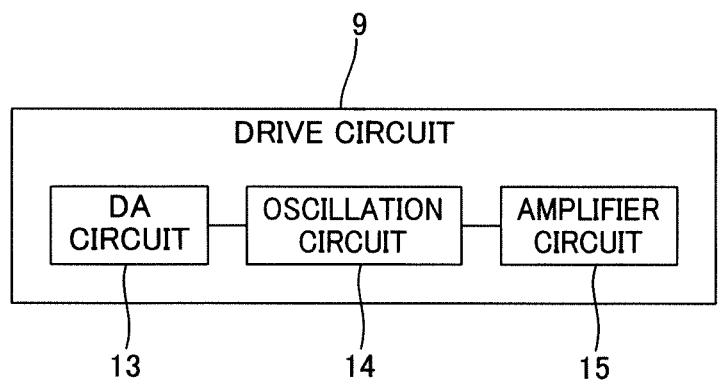
FIG. 1B is a diagram illustrating the configuration of a drive circuit installed in the input device.

FIG. 1A is a diagram illustrating the configuration of an input device according to a present embodiment. FIG. 1B is a diagram illustrating the configuration of a drive circuit installed in the input device.

An input device 1 of FIG. 1 includes: an information processing device 2 such as a smart phone or tablet terminal; a tactile interface (I/F) panel 3 disposed on the information processing device 2 as a tactile presentation device; a housing 4 that houses the information processing device 2 and the tactile I/F panel 3; and a cover 5 that covers an outer periphery of an upper surface of the tactile I/F panel 3. The tactile I/F panel 3 includes piezoelectric elements 6 as vibration generation elements for generating vibration of an ultrasonic band (about 30 kHz). The information processing device 2 includes a display 7 equipped with a touch panel, a controller 8, and a drive circuit 9 vibrating the piezoelectric elements 6. The controller 8 is connected to the display 7 and the drive circuit 9. The tactile I/F panel 3 is transparent, and an operator can see data displayed on the display 7. The display 7 includes a touch panel 7a and a display 7b as a displaying device. The touch panel 7a is an electrostatic capacitance type touch panel, but may be a resistance film type touch panel.

When the operator touches the tactile I/F panel 3 with a finger, the controller 8 detects a touched position via the touch panel 7a. The controller 8 also detects detachment of the finger from the tactile I/F panel 3. In a case where the finger of the operator slides, the controller 8 further calculates a distance and a direction of movement of the finger, and the like.

The drive circuit 9 includes: a DA circuit 13 which generates a modulation waveform of several Hz to several tens Hz which are frequencies along the human sense and frequencies directly related to the generation of a tactile feeling; an oscillation circuit 14 that oscillates an excitation signal of about 30 kHz near a resonance frequency of the tactile I/F panel 3; and an amplifier circuit 15 that amplifies the signal from the DA circuit 13 to a voltage of several volts to several tens volts, and performs electric power amplification to supply a sufficient electric power to the tactile I/F panel 3. An amplitude of the excitation signal from the oscillation circuit 14 is controlled according to an envelope of the modulation waveform. The drive circuit 9 supplies driving voltages of various waveforms to the piezoelectric elements 6 in accordance with an instruction signal from the controller 8.

When the controller 8 outputs a first instruction signal for smoothly sliding the finger to the drive circuit 9, a voltage having a waveform of a constant amplitude is continuously supplied to the piezoelectric elements 6 from the drive circuit 9, and the piezoelectric elements 6 continuously generate the vibration of the ultrasonic band. Thus, the operator can smoothly slide the finger on a surface of the tactile I/F panel 3.

When the controller 8 outputs a second instruction signal for presenting an uneven feeling (i.e., a rough feeling) to the finger to the drive circuit 9, a rectangular waveform-shaped voltage, for example, is supplied periodically to the piezoelectric elements 6 from the drive circuit 9, and the piezoelectric elements 6 periodically generate the vibration of the ultrasonic band. Thus, an uneven feeling is presented on the finger on the surface of the tactile I/F panel 3.

When the controller 8 outputs a third instruction signal for stopping the vibration to the drive circuit 9, the voltage supply from the drive circuit 9 to the piezoelectric elements 6 is stopped, and the piezoelectric elements 6 stop the vibration of the ultrasonic band. Thus, a frictional feeling that the finger does not slide on the surface of the tactile I/F panel 3 is presented to the finger.

Figure 2:
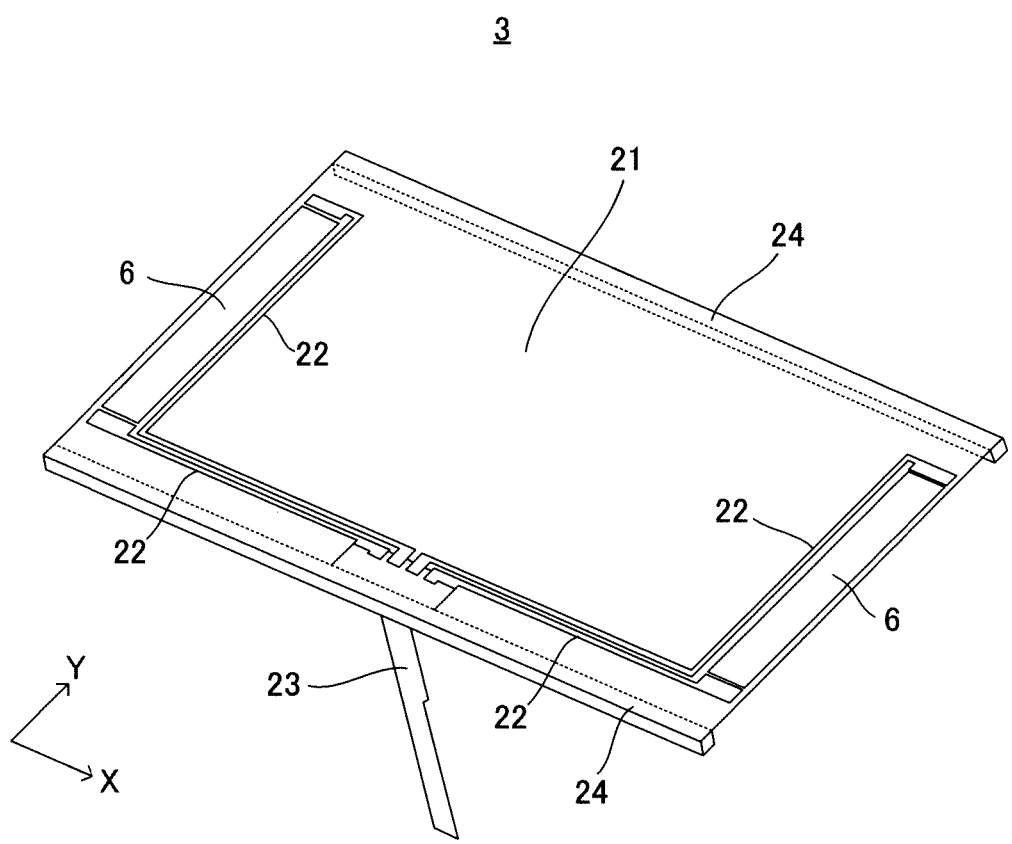
FIG. 2 is a diagram illustrating the configuration of a tactile I/F panel.

FIG. 2 is a diagram illustrating the configuration of a tactile I/F panel 3.

The tactile I/F panel 3 includes: a vibration panel 21 as a substrate composed of a transparent rectangular glass; the piezoelectric elements 6 provided at both ends in an X-direction of the vibration panel 21; a wiring pattern 22 formed on the vibration panel 21 so as to sandwich both ends in a Y-direction of each piezoelectric element 6; a flexible printed circuit (FPC) 23 connected to one end of the wiring pattern 22; and bases 24 for fixing the vibration panel 11 to the housing 4. The FPC 23 is connected to the drive circuit 9 illustrated in FIG. 1. The wiring pattern 22 is formed by printing and baking of silver paste. Thus, the production technology of the wiring pattern that is already used in the production of the touch panel can be diverted.

First Embodiment

Figure 3:
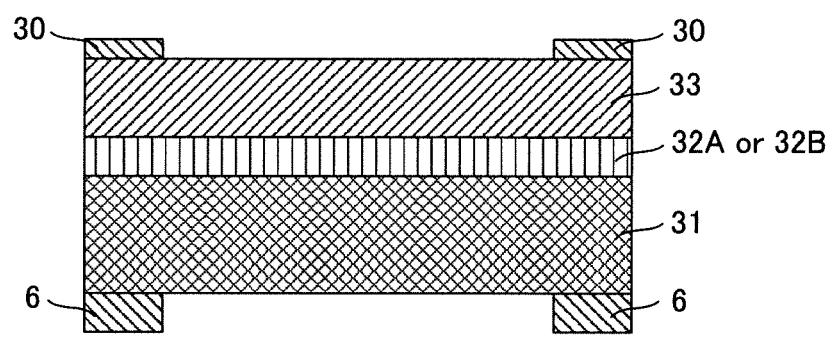
FIG. 3 is a cross-section view of a vibration panel according to a first embodiment.

FIG. 3 is a cross-section view of the vibration panel 21 according to a first embodiment.

The vibration panel 21 includes a substrate 31, an adhesive agent layer 32a or an adhesive layer 32b as a first adhesive layer (collectively referred to as "an adhesive layer 32"), and an elastic layer 33. The piezoelectric elements 6 are provided on a lower surface of the substrate 31. The adhesive layer 32 is provided on the substrate 31, and the elastic layer 33 is provided on the adhesive layer 32. The adhesive layer 32 adheres to the substrate 31 and the elastic layer 33.

The substrate 31 has an elastic modulus of 2 GPa to 200 GPa. The thickness of the substrate 31 is 100 μm to 2000 μm, preferably 200 μm to 1000 μm. The substrate 31 is composed of, for example, (i) glass containing soda lime, borosilicate, quartz, lead, aluminum silicate or the like, (ii) ceramics such as alumina, yttria, silicon carbide or silicon nitride, (iii) a transparent resin such as polymethyl methacrylate, polystyrene or polycarbonate, or (iv) a fiber reinforced resin such as a carbon fiber reinforced resin or a glass fiber reinforced resin.

The thickness of the adhesive layer 32 is 5 μm to 200 μmm, preferably 10 μm to 100 μm. The adhesive agent layer 32a is, for example, an acrylic resin, a urethane resin or a silicone resin. The adhesive layer 32b is, for example, the acrylic resin or the urethane resin.

The elastic layer 33 has an elastic modulus of 1 GPa to 100 GPa. The thickness of the elastic layer 33 is 10 μm to 500 μm, preferably 20 μm to 300 μm. The elastic modulus of the elastic layer 33 is lower than that of the substrate 31. The elastic layer 33 is, for example, a cellulose triacetate (TAC) film, a celluloid (cellulose nitrate) film or a polyethylene terephthalate (PET) film. The substrate 31 is transparent. The adhesive layer 32 and the elastic layer 33 may be transparent or non-transparent.

Figure 4A:
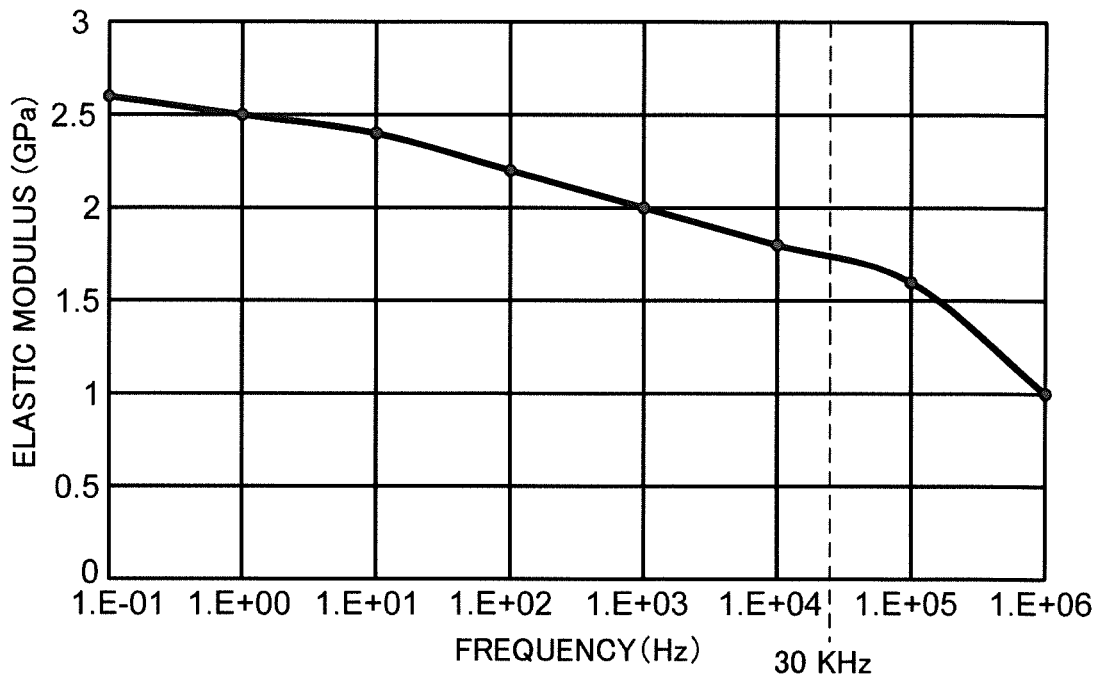
FIG. 4A is a diagram illustrating a relationship between an elastic modulus of a celluloid film and a vibration frequency of a piezoelectric element.
Figure 4B:
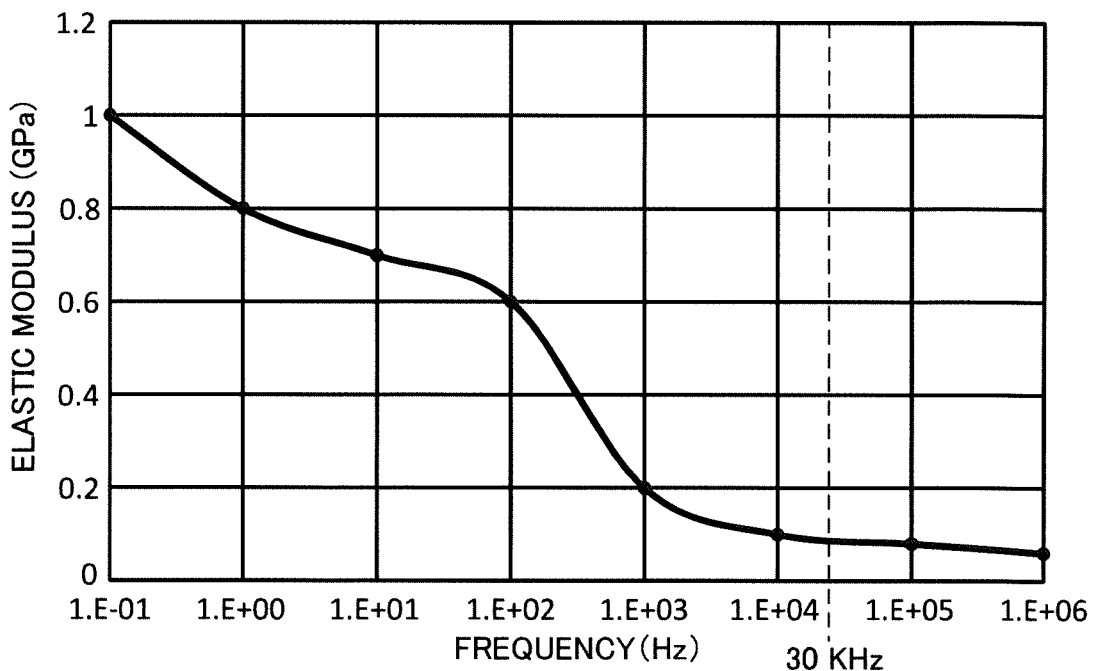
FIG. 4B is a diagram illustrating a relationship between an elastic modulus of a polyethylene film and the vibration frequency of the piezoelectric element.

FIG. 4A is a diagram illustrating a relationship between the elastic modulus of a celluloid film and a vibration frequency of the piezoelectric element 6. FIG. 4B is a diagram illustrating a relationship between an elastic modulus of a polyethylene film and the vibration frequency of the piezoelectric element 6.

When the elastic layer 33 is the celluloid film, the elastic modulus of the elastic layer 33 corresponding to the frequency of the ultrasonic band (about 30 kHz) of the piezoelectric element 6 is about 1.7 GPa to 1.8 GPa as illustrated in FIG. 4A and is a predetermined value (1 GPa) or more, and it is therefore possible to present a good tactile feeling.

When the elastic layer 33 is the polyethylene film, the elastic modulus of the elastic layer 33 corresponding to the frequency of the ultrasonic band of the piezoelectric element 6 is about 0.1 GPa as illustrated in FIG. 4 B and is the predetermined value (1 GPa) or less, and the attenuation is large and the tactile feeling greatly decreases. Therefore, it is not possible to use the polyethylene film as the elastic layer 33.

Referring to FIG. 3, since the substrate 31 has an elastic modulus of 2 GPa to 200 GPa and is composed of a hard material, the substrate 31 cannot be wound in a roll shape and it is difficult to perform a process of surface coating. In other words, when a decorative layer is directly formed on an upper surface of the substrate 31, it is not possible to bend the substrate 31, and therefore a method of forming the decorative layer is limited to spray coating or the like. For this reason, it is necessary to form the decorative layer for each substrate, and the cost for forming the decorative layer on the upper surface of the substrate 31 is increased.

On the contrary, since the elastic modulus of the elastic layer 33 is lower than that of the substrate 31 and the elastic layer 33 is composed of a soft material, the elastic layer 33 can be wound in the roll shape and the decorative layer 30 is easily formed. When the decorative layer 30 is directly formed on an upper surface of the elastic layer 33, it is possible to bend the elastic layer 33, and therefore various printing methods such as gravure printing or letterpress can be used to form the decorative layer 30. For example, the thickness of the decorative layer 30 is 5 to 10 µm. Thus, by forming the elastic layer 33 on the substrate 31, it is possible to add a decorative function easily at low cost.

Similarly, when a water repellent agent is applied on the substrate 31 for an antifouling function, when an antibacterial agent is applied on the substrate 31 for an antibacterial function, or when a friction reducing agent is applied on the substrate 31 for a friction reducing function, it is not possible to wind the substrate 31 in the roll shape, it is difficult to perform a process of the surface coating of the substrate 31 and the cost is increased.

On the contrary, when the water repellent agent is applied on the elastic layer 33 or kneaded into the elastic layer 33, when the antibacterial agent is applied on the elastic layer 33 or kneaded into the elastic layer 33, or when the friction reducing agent is applied on the elastic layer 33 or kneaded into the elastic layer 33, it is possible to bend the elastic layer 33, and therefore the water repellent agent, the antibacterial agent or the friction reducing agent can be easily applied on the elastic layer 33 at low cost or easily kneaded into the elastic layer 33 at low cost.

Here, when the water repellent agent, the antibacterial agent or the friction reducing agent is kneaded into the elastic layer 33, the water repellent agent, the antibacterial agent or the friction reducing agent is injected to form the elastic layer 33.

Figure 5:
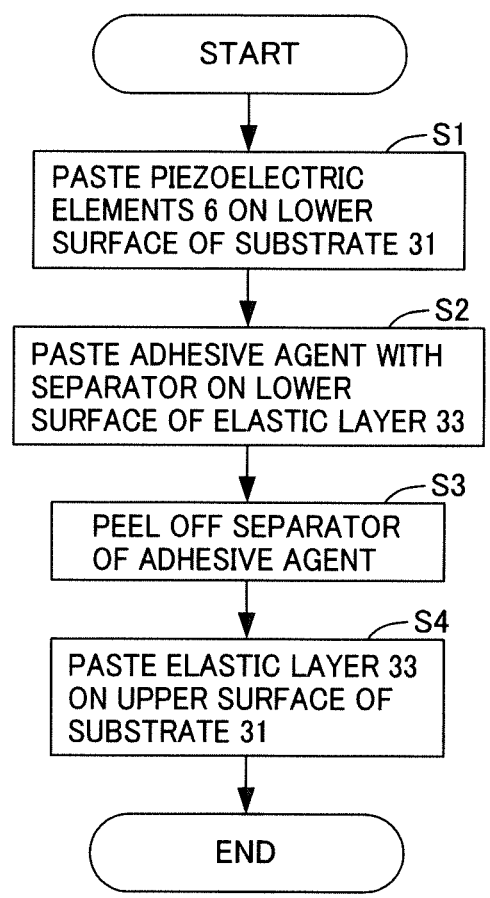
FIG. 5 is a flowchart illustrating a production process of the vibration panel of FIG. 3.

FIG. 5 is a flowchart illustrating a production process of the vibration panel 21 of FIG. 3.

First, the piezoelectric elements 6 are pasted with an adhesive on the lower surface of the substrate 31 which is cut in a predetermined size (S1). Next, an adhesive agent with a separator (i.e., the adhesive layer 32) is pasted on the lower surface of the elastic layer 33 (S2), and the separator of the adhesive agent is peeled off (S3). Then, the elastic layer 33 with the adhesive agent is pasted on the upper surface of the substrate 31 (S4) to finish the production of the vibration panel 21.

Second Embodiment

Figure 6:
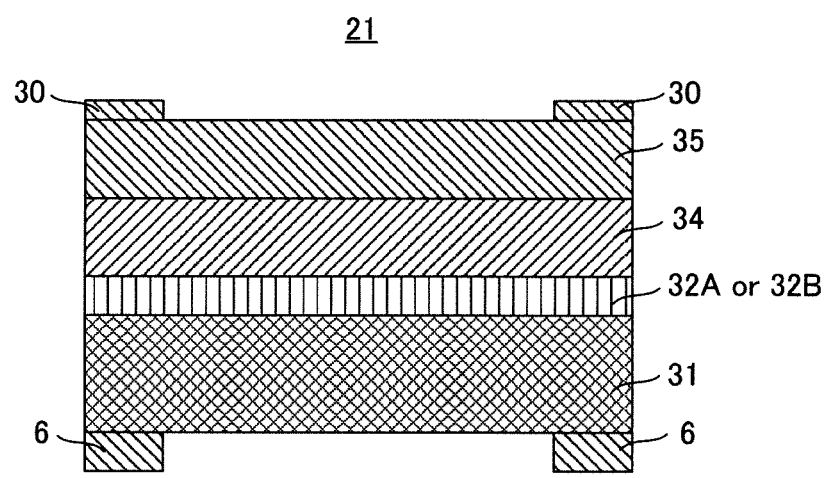
FIG. 6 is a cross-section view of a vibration panel according to a second embodiment.

FIG. 6 is a cross-section view of the vibration panel 21 according to a second embodiment. Component elements corresponding to elements of the vibration panel 21 of FIG. 3 are designated by identical reference numerals, and the description thereof is omitted.

The vibration panel 21 includes the substrate 31, the adhesive layer 32 (the adhesive agent layer 32a or the adhesive layer 32b), a first elastic layer 34, and a second elastic layer 35. The adhesive layer 32 is provided on the substrate 31, the first elastic layer 34 is provided on the adhesive layer 32, and the second elastic layer 35 is provided on the first elastic layer 34. The adhesive layer 32 adheres to the substrate 31 and the first elastic layer 34.

The first elastic layer 34 has an elastic modulus of 1 GPa to 100 GPa. The thickness of the first elastic layer 34 is 10 µm to 500 µm, preferably 20 µm to 300 µm. The elastic modulus of the first elastic layer 34 is lower than that of the substrate 31. The first elastic layer 34 is, for example, the cellulose triacetate (TAC) film, the celluloid (cellulose nitrate) film or the polyethylene terephthalate (PET) film. The first elastic layer 34 may be transparent or non-transparent.

The second elastic layer 35 has an elastic modulus of 10 GPa to 100 GPa. The thickness of the second elastic layer 35 is 1 µm to 200 µmm, preferably 2 µm to 100 µm. In the present embodiment, the thickness of the second elastic layer 35 is thinner than that of the first elastic layer 34. The elastic modulus of the second elastic layer 35 is lower than that of the first elastic layer 34, and the elastic modulus of the first elastic layer 34 is lower than that of the substrate 31. Also, in other words, the substrate 31 is the hardest in these elements, and the second elastic layer 35 is the softest in these elements. The second elastic layer 35 may be transparent or non-transparent.

The second elastic layer 35 is formed by a casting method for solidifying a liquid cellulose triacetate, a liquid cellulose acetate or a liquid fiber reinforced resin on the first elastic layer 34. Alternatively, the second elastic layer 35 is formed by a melting method for melting and solidifying the PET on the first elastic layer 34. In this way, it is possible to form the second elastic layer 35 on the first elastic layer 34 without providing an adhesive layer. Here, the first elastic layer 34 and the second elastic layer 35 may be configured using the same material, or may be configured using mutually different materials. When the mutually different materials are used, the elastic modulus of the second elastic layer 35 is set lower than that of the first elastic layer 34.

A sum rule of a formula (1) is generally applied to the elastic modulus of a composite material.

$$Ec = Ef \cdot Vf + En(1-Vf) \quad (1)$$

wherein the Ec is the whole elastic modulus of the composite material, the Ef is an elastic modulus of a filler (e.g. the second elastic layer 35), the En is an elastic modulus of a matrix (e.g. the first elastic layer 34), and the Vf is a filler fraction.

When the thickness of the second elastic layer 35 is thinner than that of the first elastic layer 34, an effect of the second elastic layer 35 on the elastic modulus of the entire vibration panel 21 is lowered based on the formula (1). When the first elastic layer 34 has the elastic modulus of 1.8 GPa and the thickness of 50 µm and the second elastic layer 35 has the elastic modulus of 0.1 GPa and the thickness of 0.5 µm, the elastic modulus of the entire vibration panel 21 is about 1.78 Gpa, and it is therefore possible to maintain a sufficiently large elastic modulus.

Also in FIG. 6, since the elastic modulus of each of the first elastic layer 34 and the second elastic layer 35 is lower than the elastic modulus of the substrate 31 and the first elastic layer 34 and the second elastic layer 35 are composed of soft materials, the first elastic layer 34 and the second elastic layer 35 can be wound in the roll shape, and the decorative layer 30 is easily formed on the second elastic layer 35, thereby adding the decorative function easily at low cost. Moreover, the water repellent agent, the antibacterial agent or the friction reducing agent can be easily applied on the second elastic layer 35 at low cost or easily kneaded into the second elastic layer 35 at low cost.

Figure 7:
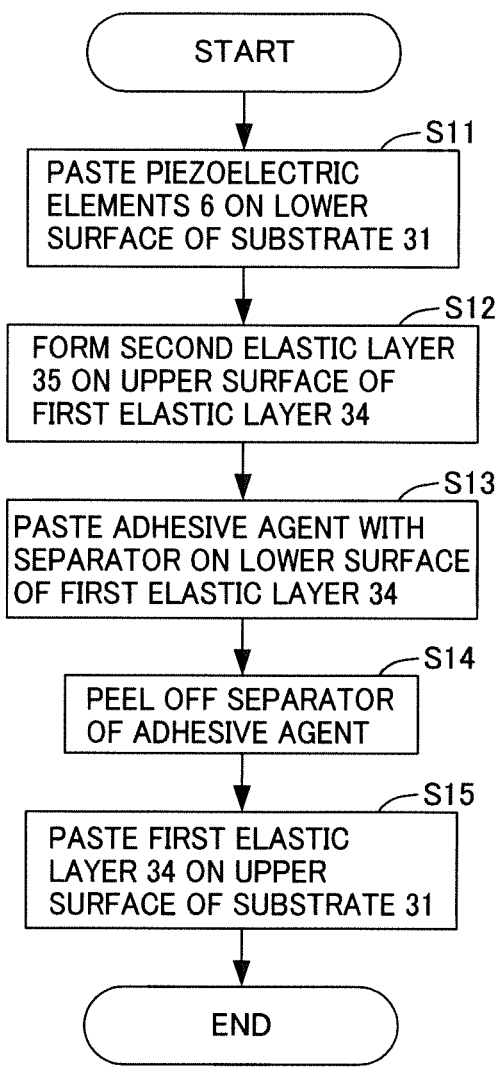
FIG. 7 is a flowchart illustrating a production process of the vibration panel of FIG. 6.

FIG. 7 is a flowchart illustrating a production process of the vibration panel 21 of FIG. 6.

The piezoelectric elements 6 are pasted with the adhesive on the lower surface of the substrate 31 which is cut in the predetermined size (S11). Next, the second elastic layer 35 is formed on the upper surface of the first elastic layer 34 (S12). Next, the adhesive agent with the separator (i.e., the adhesive layer 32) is pasted on the lower surface of the first elastic layer 34 (S13), and the separator of the adhesive agent is peeled off (S14). Then, the first elastic layer 34 with the adhesive agent is pasted on the upper surface of the substrate 31 (S15) to finish the production of the vibration panel 21.

Third Embodiment

Figure 8:
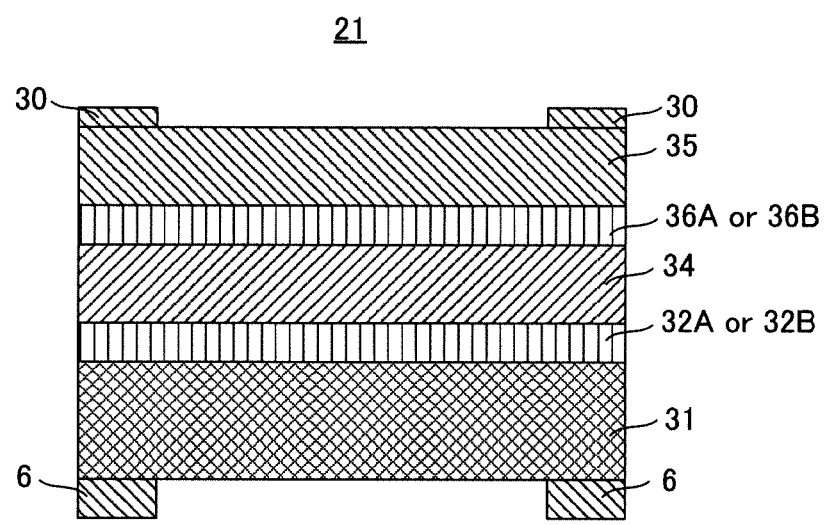
FIG. 8 is a cross-section view of a vibration panel according to a third embodiment.

FIG. 8 is a cross-section view of the vibration panel 21 according to a third embodiment. Component elements corresponding to elements of the vibration panel 21 of FIG. 6 are designated by identical reference numerals, and the description thereof is omitted.

The vibration panel 21 of FIG. 8 includes a second adhesive agent 36A or a second adhesive 36B (collectively referred to as "a second adhesive layer 36") between the first elastic layer 34 and the second elastic layer 35. The other elements are the same as corresponding elements of the vibration panel 21 of FIG. 6.

The second adhesive layer 36 adheres to the lower surface of the second elastic layer 35 and the upper surface of the first elastic layer 34. The thickness of the second adhesive layer 36 is 5 μm to 200 μm, preferably 10 μm to 100 μm. The second adhesive agent layer 36A is, for example, the acrylic resin, the urethane resin or the silicone resin. The second adhesive layer 36B is, for example, the acrylic resin or the urethane resin.

The second elastic layer 35 is, for example, the cellulose triacetate (TAC) film, the celluloid (cellulose nitrate) film, the polyethylene terephthalate (PET) film, or the fiber reinforced resin such as the carbon fiber reinforced resin or the glass fiber reinforced resin. Here, the first elastic layer 34 and the second elastic layer 35 may be configured using the same material, or may be configured using the mutually different materials. When the mutually different materials are used, the elastic modulus of the second elastic layer 35 is set lower than that of the first elastic layer 34.

Also in FIG. 8, since the elastic modulus of each of the first elastic layer 34 and the second elastic layer 35 is lower than the elastic modulus of the substrate 31 and the first elastic layer 34 and the second elastic layer 35 are composed of the soft materials, the first elastic layer 34 and the second elastic layer 35 can be wound in the roll shape, and the decorative layer 30 is easily formed on the second elastic layer 35, thereby adding the decorative function easily at low cost. Moreover, the water repellent agent, the antibacterial agent or the friction reducing agent can be easily applied on the second elastic layer 35 at low cost or easily kneaded into the second elastic layer 35 at low cost.

Figure 9:
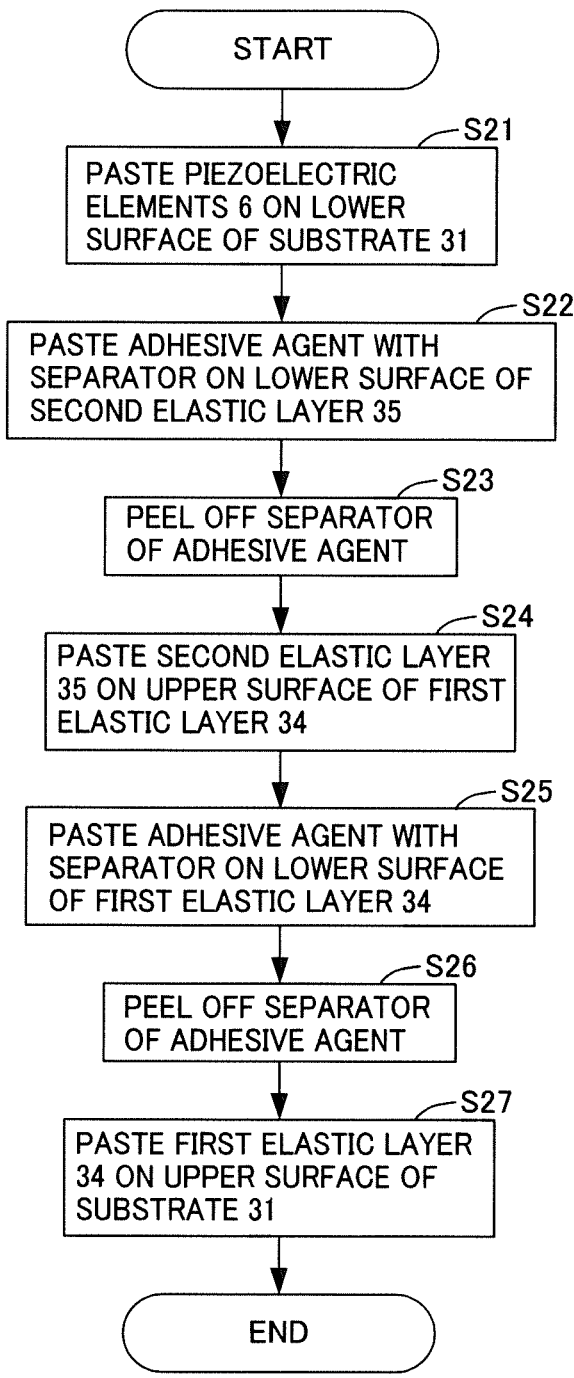
FIG. 9 is a flowchart illustrating a production process of the vibration panel of FIG. 8.

FIG. 9 is a flowchart illustrating a production process of the vibration panel 21 of FIG. 8.

First, the piezoelectric elements 6 are pasted with the adhesive on the lower surface of the substrate 31 which is cut in the predetermined size (S21). Next, the adhesive agent with the separator (i.e., the second adhesive layer 36) is pasted on the lower surface of the second elastic layer 35 (S22), and the separator of the adhesive agent is peeled off (S23). Then, the second elastic layer 35 with the adhesive agent is pasted on the upper surface of the first elastic layer 34 (S24). Next, the adhesive agent with the separator (i.e., the adhesive layer 32) is pasted on the lower surface of the first elastic layer 34 (S25), and the separator of the adhesive agent is peeled off (S26). Then, the first elastic layer 34 with the adhesive agent is pasted on the upper surface of the substrate 31 (S27) to finish the production of the vibration panel 21.

Figure 10A:
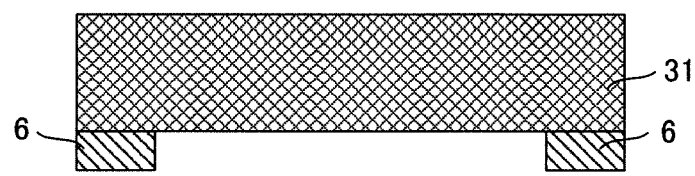
FIG. 10A is a cross-section view of a vibration panel according to a first comparative example.
Figure 10B:
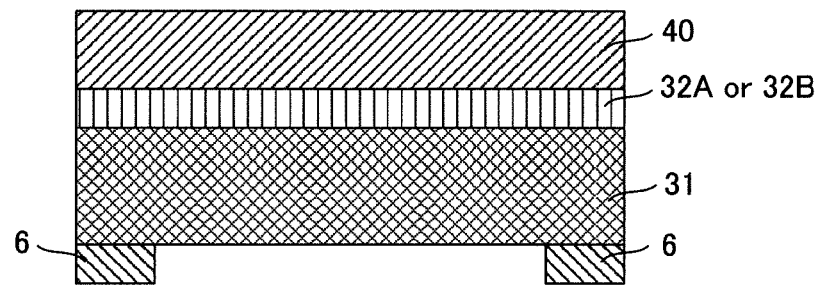
FIG. 10B is a cross-section view of a vibration panel according to a second comparative example.
Figure 10C:
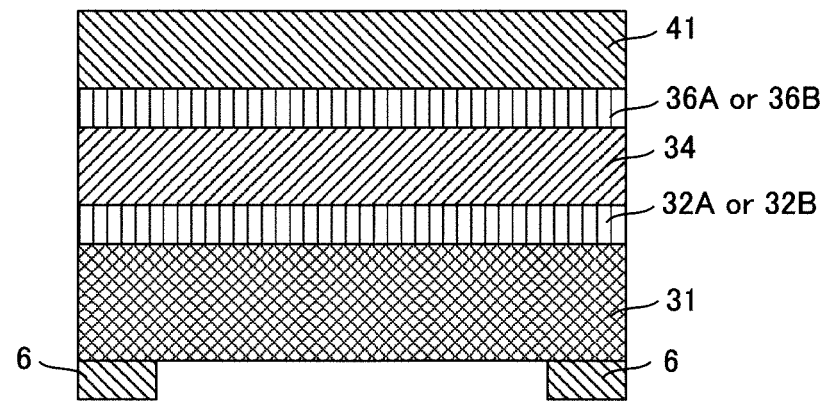
FIG. 10C is a cross-section view of a vibration panel according to a third comparative example.

FIG. 10A is a cross-section view of a vibration panel 21-1 according to a first comparative example. FIG. 10B is a cross-section view of a vibration panel 21-2 according to a second comparative example. FIG. 10C is a cross-section view of a vibration panel 21-3 according to a third comparative example.

In the vibration panel 21-1 according to the first comparative example, the piezoelectric elements 6 are pasted on the lower surface of the substrate 31, and the elastic layer, the adhesive agent layer and the adhesive layer and the like are not provided.

The vibration panel 21-2 according to the second comparative example includes the substrate 31, the adhesive layer 32, and an elastic layer 40 having a lower elastic modulus than the elastic layer 33. That is, the vibration panel 21-2 differs in including the elastic layer 40 having the lower elastic modulus than the elastic layer 33, from the vibration panel 21 of the first embodiment of FIG. 3.

The vibration panel 21-3 according to the third comparative example includes the substrate 31, the adhesive layer 32, the first elastic layer 34, and a second elastic layer 41 having a higher elastic modulus than the first elastic layer 34. That is, the vibration panel 21-3 differs in including the second elastic layer 41 having the higher elastic modulus than the first elastic layer 34, from the vibration panel 21 of the third embodiment of FIG. 8.

Inventors of the present application have produced the vibration panels 21-1 to 21-3 according to the first to third comparative examples and the vibration panels 21 according to the first to third embodiments, and have conducted an experiment for measuring a vibration amount of each vibration panel.

First, the inventors of the present application have pasted piezoelectric elements of 50 mm×5 mm on the lower surface of a substrate made of soda lime glass of 120 mm×70 mm (having the elastic modulus of 70 GPa and the thickness of 0.55 mm) with an epoxy adhesive to produce the vibration panel 21-1 according to the first comparative example.

Next, the inventors of the present application have pasted a polyethylene film (having the elastic modulus of 0.1 GPa and the thickness of 200 μm) as the elastic layer 40 on the upper surface of the substrate (i.e., the vibration panel 21-1) made of the soda lime glass with an acrylic adhesive agent to produce the vibration panel 21-2 according to the second comparative example.

Next, the inventors of the present application have formed a polysilazane silica-based hard coat layer (having the elastic modulus of 33 GPa and the thickness of 2 μm) as the second elastic layer 41 on the upper surface of a polycycloolefin polymer (having the elastic modulus of 2.2 GPa and the thickness of 100 μm) as the first elastic layer 34, and then have pasted the polycycloolefin polymer on the upper surface of the substrate made of the soda lime glass with the acrylic adhesive agent to produce the vibration panel 21-3 according to the third comparative example.

Next, the inventors of the present application have pasted a cellulose triacetate film (having the elastic modulus of 1.7 GPa and the thickness of 60 μm) as the elastic layer 33 on the upper surface of the substrate made of the soda lime glass with the acrylic adhesive agent to produce the vibration panel 21 according to the first embodiment.

Next, the inventors of the present application have formed an acrylic hard coat layer (having the elastic modulus of 1 GPa and the thickness of 3 μm) as the second elastic layer 35 on the upper surface of a cellulose triacetate film (having the elastic modulus of 1.7 GPa and the thickness of 60 μm) as the first elastic layer 34, and then have pasted the cellulose triacetate film on the upper surface of the substrate made of the soda lime glass with the acrylic adhesive agent to produce the vibration panel 21 according to the second embodiment.

Next, the inventors of the present application have pasted a PET film (having the elastic modulus of 230 MPa and the thickness of 15 μm) as the second elastic layer 35 on the upper surface of the cellulose triacetate film (having the elastic modulus of 1.7 GPa and the thickness of 60 μm) as the first elastic layer 34 with the acrylic adhesive agent, and then have pasted the cellulose triacetate film on the upper surface of the substrate made of the soda lime glass with the acrylic adhesive agent to produce the vibration panel 21 according to the third embodiment.

The inventors of the present application have connected a function generator (Agilent Technologies "33210A") to a power amplifier (NF CORPORATION "HAS-4012") to generate a driving signal having a frequency of 30 kHz and a voltage magnitude of ±15V. Then, the inventors have supplied the driving signal to the piezoelectric elements of each vibration panel, and have measured the vibration amount of each vibration panel using a laser Doppler vibrometer (ONO SOKKI CO., LTD "LV-1800").

FIG. 11 is a diagram illustrating a measurement result of vibration amounts of the respective vibration panels. FIG. 11 illustrates a ratio of the vibration amount of each of other vibration panels to the vibration panel 21-1 when the vibration amount of the vibration panel 21-1 according to the first comparative example is 1, in addition to the vibration amount of each vibration panel.

The vibration amount of the vibration panel 21 according to the first embodiment is 5% lower than the vibration amount of the vibration panel 21-1 according to the first comparative example, and the vibration amount of the vibration panel 21-2 according to the second comparative example is 35% lower than the vibration amount of the vibration panel 21-1 according to the first comparative example. This is because the elastic layer 40 of the vibration panel 21-2 according to the second comparative example has a lower elastic modulus than the elastic layer 33 of the vibration panel 21 according to the first embodiment and easily absorbs the vibration.

Also, the vibration amount of the vibration panel 21 according to the second embodiment is 10% lower than the vibration amount of the vibration panel 21-1 according to the first comparative example, and the vibration amount of the vibration panel 21-3 according to the third comparative example is 38% lower than the vibration amount of the vibration panel 21-1 according to the first comparative example. A reason why the vibration amount of the vibration panel 21-3 according to the third comparative example is significantly less than the vibration amount of the vibration panel 21 according to the second embodiment is that the elastic modulus of the second elastic layer is larger than that of the first elastic layer disposed under the second elastic layer, and the energy of the vibration is absorbed by the first elastic layer and is hardly transmitted to the second elastic layer.

Also, the vibration amount of the vibration panel 21 according to the second embodiment is 10% lower than the vibration amount of the vibration panel 21-1 according to the first comparative example, and the vibration amount of the vibration panel 21 according to the third embodiment is 15% lower than the vibration amount of the vibration panel 21-1 according to the first comparative example. Thus, a reason why the vibration amount of the vibration panel 21 according to the third embodiment is less lowered from the vibration of the vibration panel 21 according to the second embodiment is that the elastic modulus of the second elastic layer is less than that of the first elastic layer disposed under the second elastic layer, and the absorption of the energy of the vibration by the first elastic layer and the second elastic layer is suppressed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A tactile presentation device comprising:
a substrate that has a lower surface on which a vibration generation element is mounted, and an upper surface opposite to the lower surface;
a first adhesive layer that is disposed on the upper surface of the substrate;
a first elastic layer that is directly in contact with the first adhesive layer, and has a lower elastic modulus than an elastic modulus of the substrate;
wherein the elastic modulus of the first elastic layer corresponding to a frequency of an ultrasonic band of the vibration generation element is equal to or more than 1 GPa.

2. The tactile presentation device as claimed in claim 1, wherein
the substrate comprising a material that resists being wound in a roll shape, and the first elastic layer comprising a material capable of being wound in the roll shape.

3. The tactile presentation device as claimed in claim 1, further comprising:
a decorative layer on the first elastic layer.

4. The tactile presentation device as claimed in claim 1, wherein
at least one of a water repellent agent, an antibacterial agent and a friction reducing agent is included on the first elastic layer or is included in the first elastic layer.

5. A tactile presentation device comprising:
a substrate having a lower surface on which a vibration generation element is mounted, and an upper surface opposite to the lower surface;
a first adhesive layer on the upper surface of the substrate;
a first elastic layer on the first adhesive layer, and having a lower elastic modulus than an elastic modulus of the substrate;
wherein the elastic modulus of the first elastic layer corresponding to a frequency of an ultrasonic band of the vibration generation element is equal to or more than 1 GPa;
a second elastic layer on the first elastic layer, having a thinner thickness than a thickness of the first elastic layer, and having a lower elastic modulus than an elastic modulus of the first elastic layer.

6. The tactile presentation device as claimed in claim 5, wherein
the second elastic layer is disposed on the first elastic layer through a second adhesive layer different from the first adhesive layer.

7. The tactile presentation device as claimed in claim 5, wherein
the second elastic layer is directly included on the first elastic layer.

* * * * *